United States Patent [19]
Hoppensteadt et al.

[11] Patent Number: 5,587,874
[45] Date of Patent: Dec. 24, 1996

[54] ELECTRICAL BUSWAY METER SERVICE PANEL COMBINATION

[76] Inventors: Dale Hoppensteadt, 22 W. 492 Lakeside Dr., Glen Ellyn, Ill. 60137; Joseph L. Mirocha, 14333 S. Glen Dr. West, Lockport, Ill. 60441

[21] Appl. No.: 515,649

[22] Filed: Aug. 16, 1995

[51] Int. Cl.$^6$ ......................................... H02B 1/00
[52] U.S. Cl. ........................ 361/663; 52/220.8; 174/48
[58] Field of Search ............................... 52/220.1, 220.8; 174/37–38, 48–49, 57, 61–64, 65 R, 86; 361/622–624, 627–628, 631, 659, 663–664, 668, 826

[56] References Cited

U.S. PATENT DOCUMENTS

| | | | |
|---|---|---|---|
| 3,025,432 | 3/1962 | Giegerich | 174/48 |
| 3,659,247 | 4/1972 | Chaney et al. | 339/20 |
| 3,879,641 | 4/1975 | Byrd | 361/664 |
| 3,907,334 | 9/1975 | Schera, Jr. | 174/86 |
| 3,936,589 | 2/1976 | Teeters, Sr. et al. | 174/65 R |
| 4,013,329 | 3/1977 | Hugin | 339/9 |
| 4,150,867 | 4/1979 | Knickerbocker | 339/97 P |
| 4,248,659 | 2/1981 | Pate et al. | 174/65 R |
| 4,887,187 | 12/1989 | Nickola | 361/369 |

*Primary Examiner*—Gregory D. Thompson
*Attorney, Agent, or Firm*—Lee, Mann, Smith, McWilliams, Sweeney & Ohlson

[57] ABSTRACT

An electrical busway meter service panel combination for mounting on the foundation of a building. The invention combines electric metering equipment or current transformers, and service disconnecting means into a single operating unit, the unit being adjustable for mounting on foundation walls of various thicknesses. The invention also has a busway connecting a meter fitting housing which houses the metering equipment or current transformer, to the service disconnecting means, the busway also holds the cables connected between the metering equipment or current transformer and the service disconnecting means. The busway may have multiple configurations for allowing mounting of the invention in building having no basements, half basements, or full basements.

8 Claims, 9 Drawing Sheets

ELECTRICAL BUSWAY METER SERVICE PANEL COMBINATION

BACKGROUND OF THE INVENTION

The present invention relates to mounting meter fittings for utilities, more particularly mounting meter fittings for holding metering equipment or current transformers, conduits and service load centers together as one unit with the unit being mountable on building foundation walls of varying thicknesses.

Existing practices in the construction and electrical industry for residential use of metering equipment and service disconnecting means consist of mounting a meter receptacle or fitting on the exterior of a residence, running a separate pipe or conduit from the meter receptacle or fitting, penetrating the wall of the residence with the pipe or conduit, then picking up the conduit on the interior of the building, installing wire in pipe or conduit, and wiring into a breaker panel and the like.

SUMMARY OF THE INVENTION

The invention replaces several of these separate elements, by combining the meter fitting, and service load center together as a single pre-wired telescoping busway unit. Because of variations in the field, particularly as to the layout of a foundation design of a house, thickness of the foundation and the like, the telescoping busway must be of variable length, e.g. to penetrate differing thicknesses of foundation walls. Other variations include different relative placement of service centers (including circuit breaker panels) and 7 busway assembly, such as for a standard basement, a split level with a family room, or a home with no basement.

Among advantages in the proposed invention are the integral use of a foundation support, the ability to pre-wire the metering equipment or current transformers, and service panel, and use in different architectural layouts. Among features included in the invention are the use of a particular specialized conductor or wire (200 amp version) which enables some level of flexibility as the telescoping busway is extended or closed, said wire also being adapted to turning in tighter radii than standard conductors, and the use of a standard meter socket with a special rectangular hole punched therein to accept the telescoping busway and standard wire in 100 amp version.

The panel consists of a meter fitting housing having a utility meter or a current transformer mounted therein, a busway for holding cables and conduits, an optional foundation bracket, and a service disconnecting means. The busway is attached between the meter fitting housing and the electrical service disconnecting means located within a building. The busway's length is adjustable to accommodate different foundation wall thicknesses. Adjustment is accomplished by sliding a certain amount of the busway into a throat or metal trough located inside the meter fitting housing. The busway can be locked into place once installation is complete. The busway is a metal raceway (steel trough) that includes the service entrance conductors. The electrical meter service panel combination may be pre-wired so that the conductors are pre-wired and connected at one end to the terminals of meter fittings of a utility meter or current transformer. The other end of the conductors attaches to the service disconnecting means enclosure. An optional adjustable foundation bracket attached to the meter fitting housing is mountable to the top of a foundation wall. The bracket consists of two interconnecting segments. Nuts attached to two bolts connecting the segments together are turned on the bolts to adjust the bracket to securely fit on the top of foundation walls of varying thicknesses.

DESCRIPTION OF PREFERRED EMBODIMENTS

Figures 1, 2:
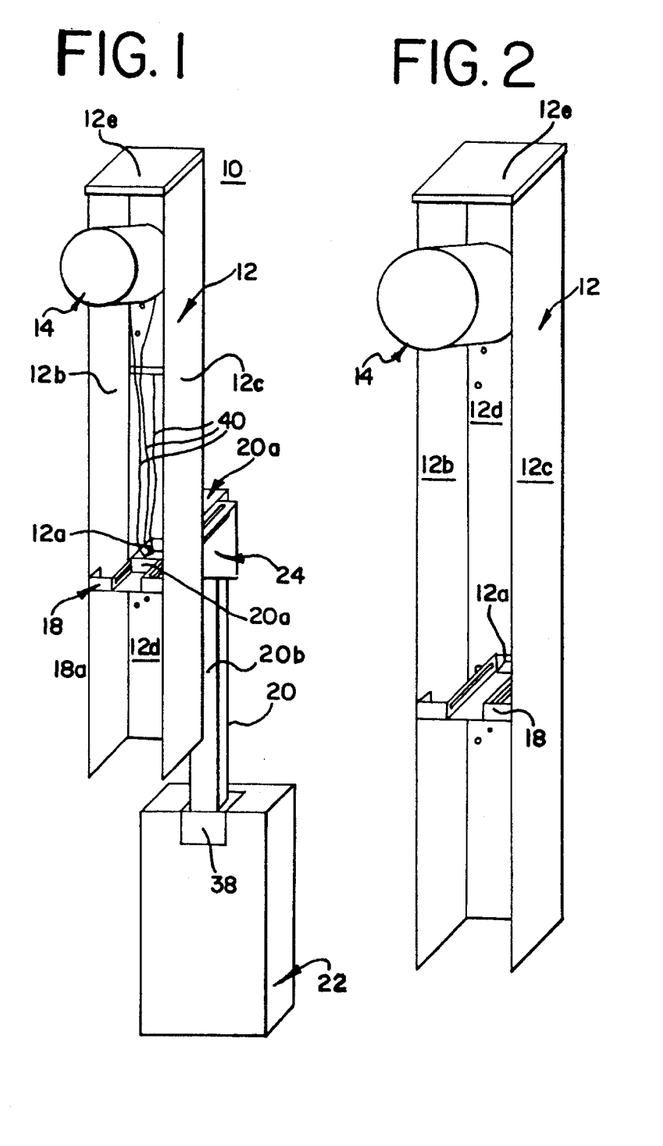
FIG. 1 is a perspective view of front of the electrical busway meter service panel combination having the front cover removed from the meter fitting housing showing a horizontal busway section therein.
FIG. 2 is a perspective view of the front of the meter fitting housing with the front cover removed having a utility meter and a trough bracket mounted therein.

Referring now to the drawings, and more particularly, to FIG. 1, is an embodiment of an electric meter service panel combination constructed in accordance with the instant invention is generally shown at 10.

Figures 4, 5, 6, 7:
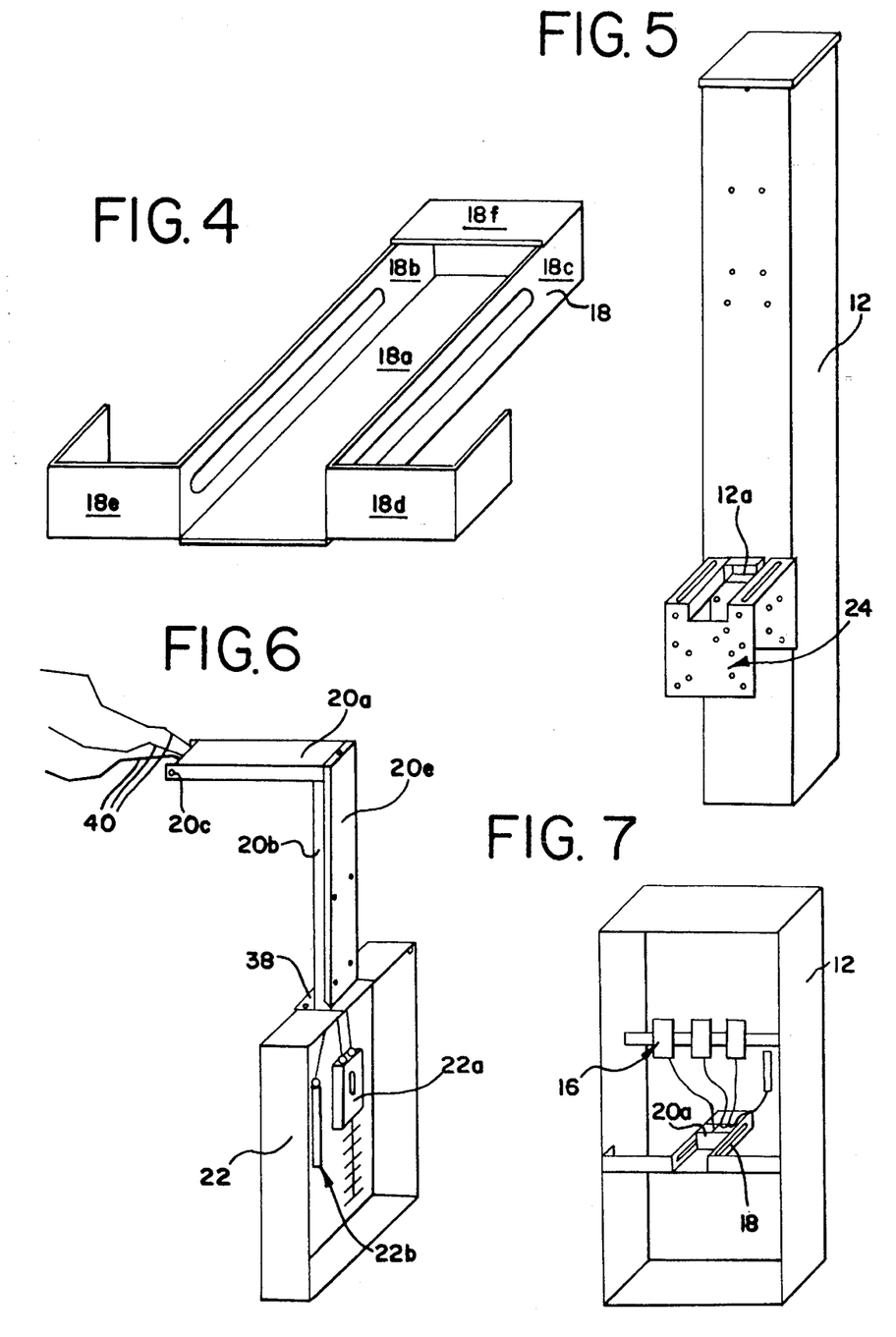
FIG. 4 is a perspective view of the trough bracket.
FIG. 5 is a perspective view of the rear of the meter fitting housing showing the foundation bracket mounted thereto.
FIG. 6 is a perspective view of the busway connected to a service circuit breaker panel with the service circuit breaker panel cover removed showing the circuit breaker.
FIG. 7 is a front perspective view of the meter fitting housing with the front cover removed showing current transformers and the trough bracket mounted therein.

The electrical service panel combination 10 includes a meter fitting housing 12 having an aperture 12a therein. Either a utility meter 14 or current transformer 16 (as seen in FIG. 7) is mounted inside the meter fitting housing 12. A trough bracket 18 mounts inside the meter fitting housing 12 adjacent aperture 12a. An insert portion 20a of a cable busway 20 is adjustably mounted in the trough bracket 18. The other end of the cable busway 20 is mounted to a service breaker panel 22. The entire electrical meter service panel combination 10 may be pre-wired having electrical wiring connecting to either a utility meter 14 or a current transformer 16 and running out of the meter fitting housing 12 through the aperture 12a, and through the cable entrance bus 20 to the service breaker panel 22.

Figure 3:
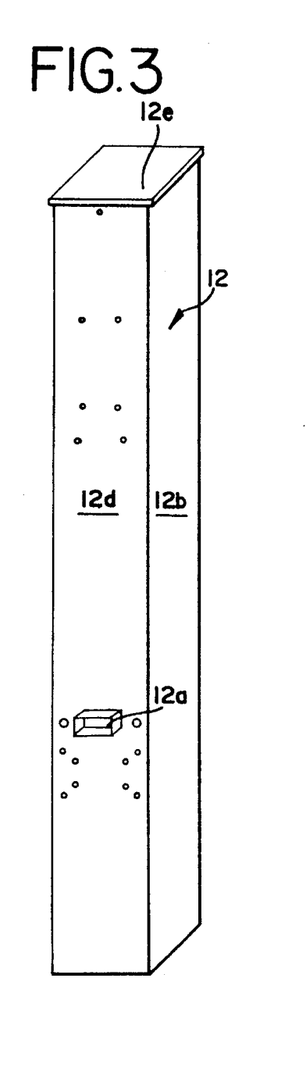
FIG. 3 is a perspective view of the rear of the meter fitting housing showing the aperture for sliding the busway therethrough.

As seen in FIGS. 1, 2 and 3, the meter fitting housing 12 is comprised of two vertical side panels 12b and 12c, a vertical rear panel 12d, and a vertical front panel (not shown). The vertical rear panel 12d has a rectangular aperture 12a therein. A top cover 12e is mounted on top of the edges of meter fitting housing panels 12b, 12c, 12d and the front panel. As better seen in FIG. 4, the trough bracket 18 mounted inside the meter fitting housing 12 is comprised of an elongated raceway 18a having elongated slotted sides 18b and 18c. L-shaped mounting elements 18d and 18e extend from the front end of the trough bracket 18. A rectangular top piece 18f is positioned at the rear end of the trough bracket 18. As seen in FIGS. 1, 2 and 7, the L-shaped mounting elements are attached to the inside of side panels 12b and 12c. The rear end of the trough bracket 12 is mounted within the rectangular aperture 12a of the meter fitting housing.

Figure 15:
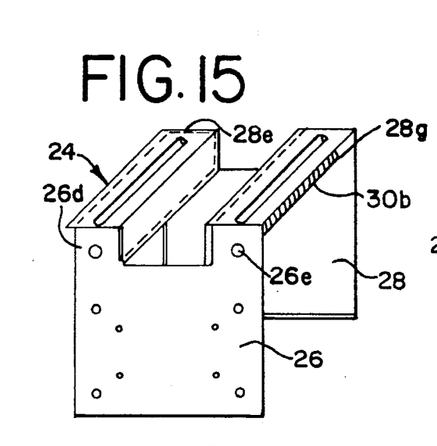
FIG. 15 is a perspective view of the foundation bracket in a fully contracted position.
Figures 16, 17, 19:
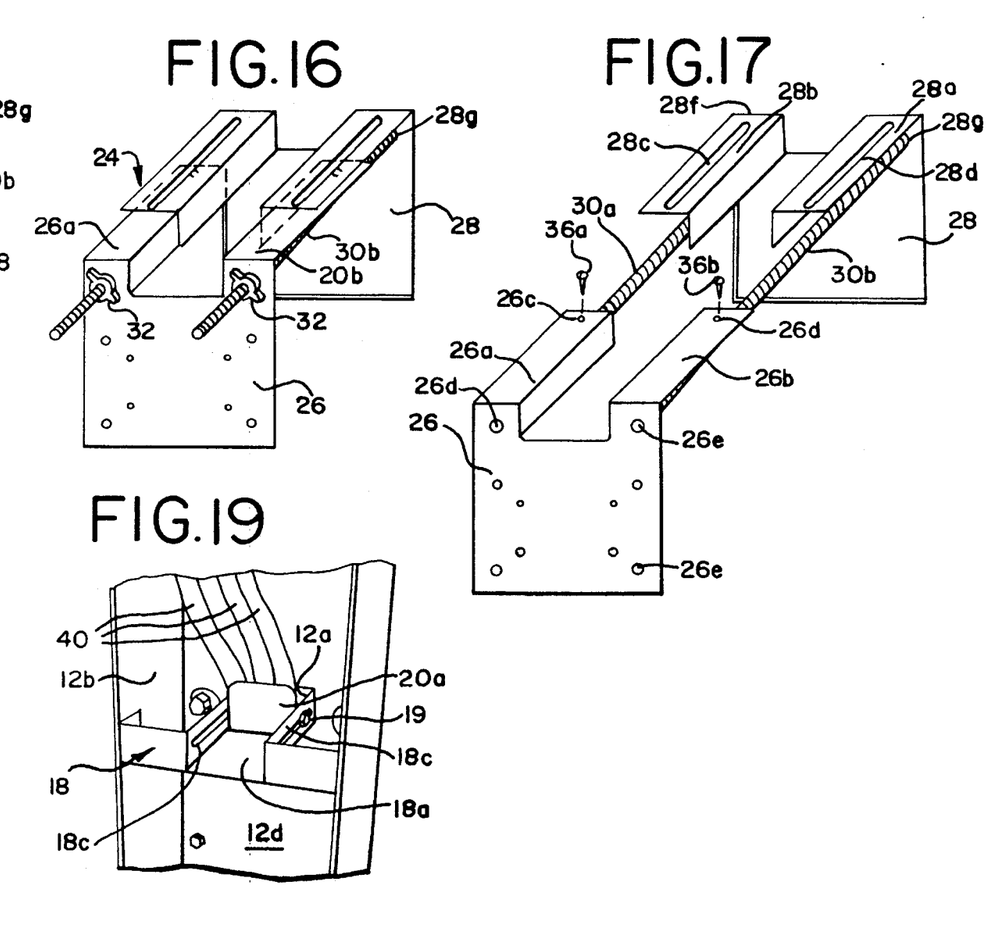
FIG. 16 is a perspective view of the foundation bracket in a partially extended position.
FIG. 17 is a perspective view of the foundation bracket in a fully extended position.
FIG. 19 is a perspective view of the meter fitting housing showing the trough bracket, the insert portion of the busway slid in through the aperture of the housing and into the trough with cables extending out of the insert portion.

As seen in FIG. 5, a foundation bracket 24 is mounted to the meter fitting housing 12. As better seen in FIGS. 15, 16 and 17, the foundation bracket consists of a first bracket segment 26, a second bracket segment 28, and a pair of elongated threaded bolts 30a and 30b. The first bracket segment 26 has two L-shaped extending portions 26a and 26b. The two extending portions 26a and 26b have holes 26c and 26d therethrough. The first bracket segment also has bolt holes 26e and 26d therethrough. The second bracket segment 28 has two corresponding L-shaped extending portions 28a and 28b. The two extending portions 28a and 28b have longitudinal slots 28c and 28d therethrough. The second bracket segment 28 also has bolt holes 28e and 28f therethrough. Bolts 30a and 30b extend through bolt holes 26e, 28e, 26f and 28f to connect the first bracket segment 26 with the second bracket segment 28. Nut elements 32 are rotated on bolts 30a and 30b to adjustably mount the foundation bracket 24 onto the top of a foundation wall 34. As seen in FIG. 17, bolts 36a and 36b are positioned in holes 26c and 26d and in corresponding slots 28c and 28d. The bolts 36a and 36b are tightened in holes 26c and 36b and slots 28c and 28d once the foundation bracket 24 has been securely mounted to the foundation wall 34 to securely lock the first bracket segment 26 and second bracket segment 28 together thereby, securing the mounting of the electrical meter panel combination to a foundation wall.

As seen in FIG. 5, 15, 16 and 17, the foundation bracket 24 mounts to the meter fitting housing 12 in a position where the extended portions 26a, 28a, 26b, and 28b are located adjacent the sides of the rectangular aperture 12a of the meter fitting housing.

Figure 12:
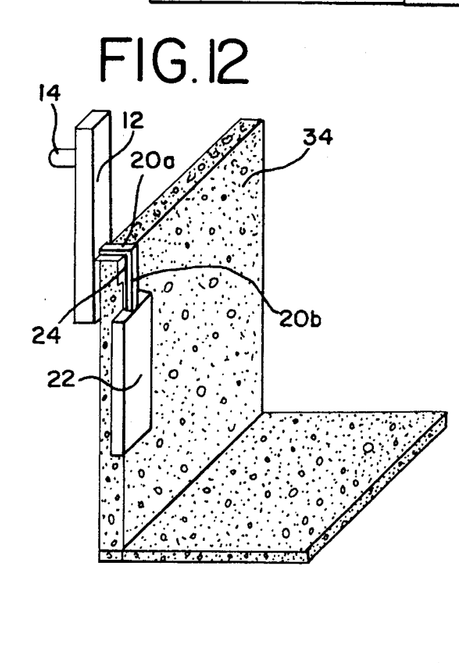
FIG. 12 is a perspective view of an embodiment of the electrical meter service panel combination mounted to a foundation wall with the service load center extending downwardly along the foundation basement wall.
Figure 13:
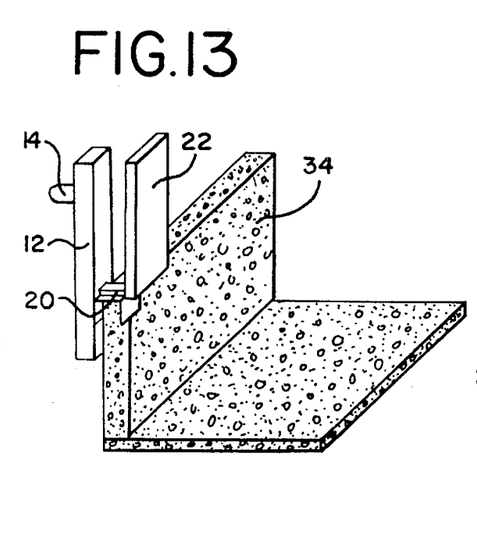
FIG. 13 is a perspective view of an embodiment of the electrical meter service panel combination mounted to a foundation wall with the service load center positioned above the foundation wall for use in a half basement.
Figure 18:
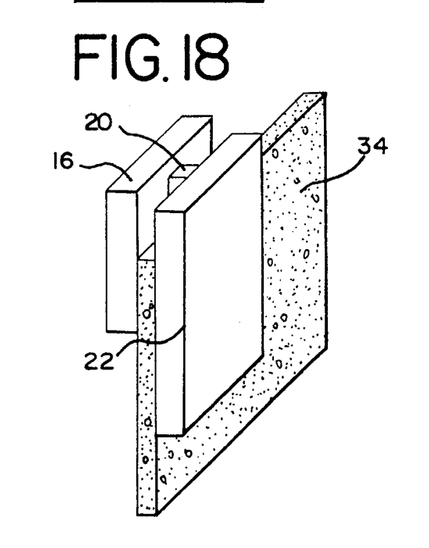
FIG. 18 is a perspective view of the electrical service meter panel combination showing the current transformer mounted against and outside the foundation wall, the service load center mounted against and inside the foundation wall with the connecting busway positioned above the top of the foundation wall.
Figures 20, 20A, 21, 22, 24, 25, 26, 28:
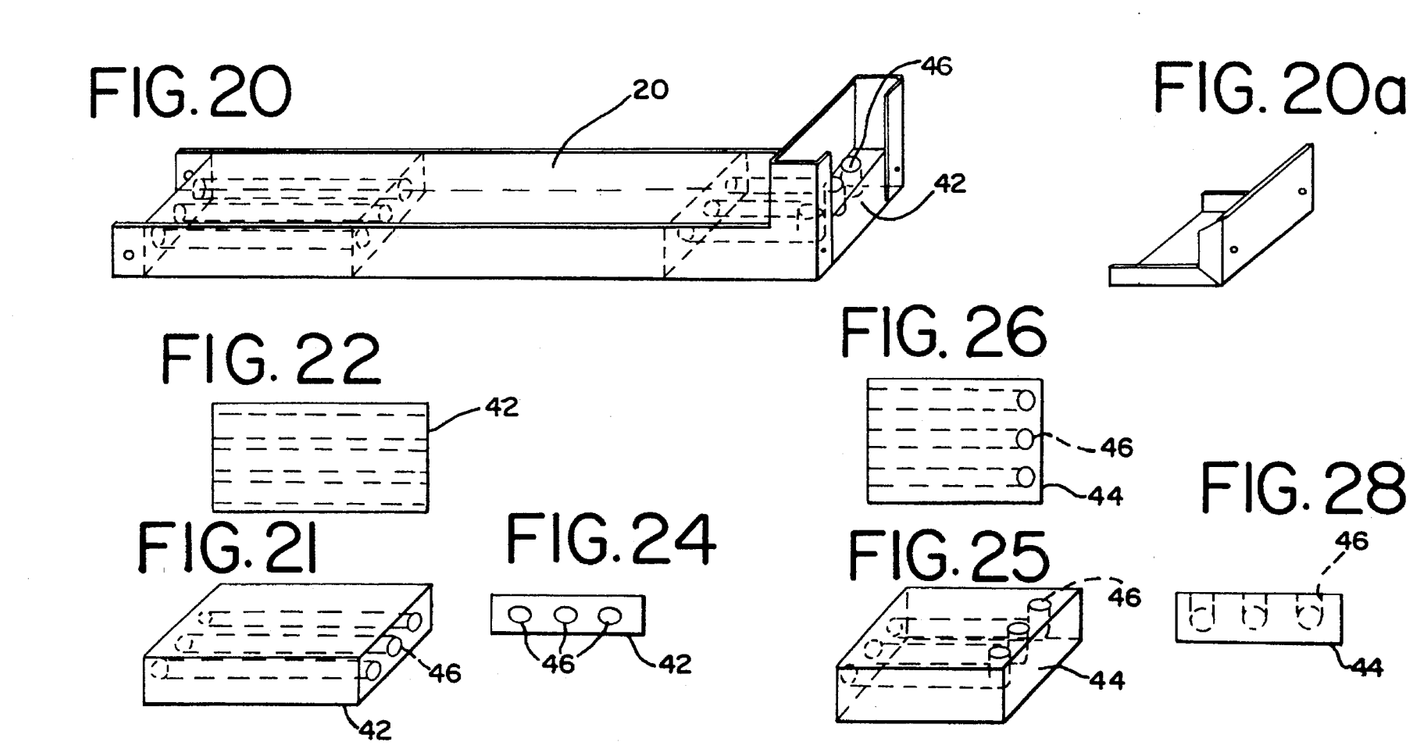
FIG. 20 is a perspective view of an elbow shaped busway having a bushing with straight cable passageways therein mounted in the straight end of the busway and a bushing having 90 degree cable passageways mounted at the elbow end of the busway.
FIG. 20(a) is perspective view of a front elbow end cover of an elbow busway.
FIG. 21 is perspective view of a bushing having straight cable passageways.
FIG. 22 is a top plan view of a bushing having straight cable passageways.
FIG. 24 is a front plan view of a bushing having straight cable passageways.
FIG. 25 is a perspective view of a bushing having a 90 degree cable passageway.
FIG. 26 is a top plan view of a bushing having a 90 degree cable passageway.
FIG. 28 is a front plan view of a bushing having a 90 degree cable passageway.
Figure 23:
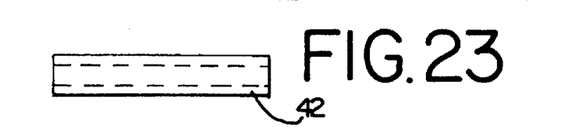
FIG. 23 is a side plan view of a bushing having straight cable passageways.
Figure 27:
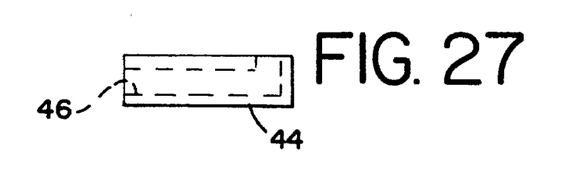
FIG. 27 is a side plan view of a bushing having a 90 degree cable passageway.

As seen in FIG. 1, the busway 20 slides through the aperture 12a into the trough bracket 18. The busway 20 may be embodied in an L-shaped elbow configuration as seen in FIGS. 1, 6, 8, 9, 12 and 13. Alternatively, the cable busway 20 may be embodied in a straight planar configuration as seen in FIGS. 13 and 18. As better seen in FIGS. 8 and 9, the L-shaped busway 20 consists of a horizontal insert bus portion 20a, a main vertical bus portion 20b, and a breaker panel mounting bracket 38. The insert bus portion 20a has a hollow rectangular configuration. The side ends of the insert portion 20a have adjustment holes 20c and 20d therein. The insert bus portion 20a is inserted through aperture 12a and slid into the trough bracket 18 along its raceway 18a as seen in FIGS. 1 and 19. Adjustment hole 20c (FIG. 6) is aligned with the slot in side wall 18c (FIG. 4) and adjustment hole 20d (FIG. 8) is aligned with the slot in side wall 18d (FIG. 4). Adjustment of the distance between the rear wall 12d of the meter fitting housing 12 and the main bus portion 20b of the service cable entrance bus is determined according to the thickness of foundation wall 34 thereby allowing the foundation wall 34 to fit securely between the rear wall 12d and the main bus portion 20b. As better seen in FIG. 19, adjustment is accomplished by sliding the insert portion 20a through the aperture 12a into the raceway 18a of the trough bracket 18 until the foundation wall is snugly between the meter fitting housing 12 and the service disconnecting means 22. Bolts are then fastened in the adjustment holes 20c and 20d and through the corresponding slots in sides 18b and 18c. Similarly, adjustment for the embodiment of the straight planer service cable entrance bus is accomplished by sliding the service entrance cable bus 20 through the aperture 12a and into the raceway 18a and tightening bolts in the adjustment holes 20c and 20d, and through corresponding slots in sides 18b and 18c. As better seen in FIGS. 8 and 9, the main vertical bus portion 20b has a detachable cover 20e for accessing the cables located in the busway 20. As seen in FIGS. 8, 9, 10 and 11, an L-shaped bus bracket plate 38 is attached to the end of the busway 20. The bus bracket plate 38 has rectangular aperture therein, in which an end portion 20f of the busway 20 fits therein and extends outwardly. The edges of the busway 20 are welded to the top side of the plate 38.

Figure 8:
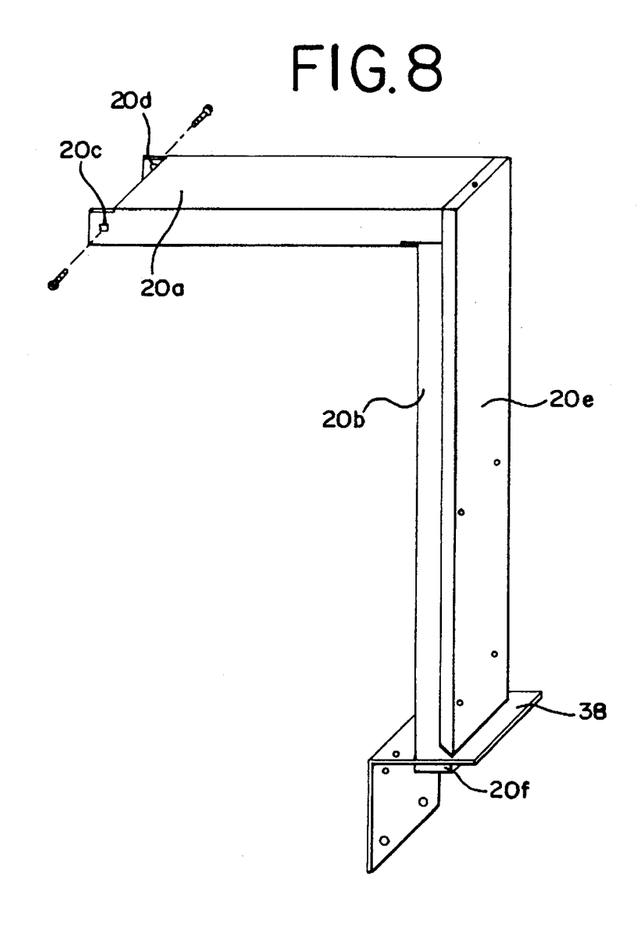
FIG. 8 is a perspective view of the busway having an insert horizontal portion and a vertical main portion.
Figure 9:
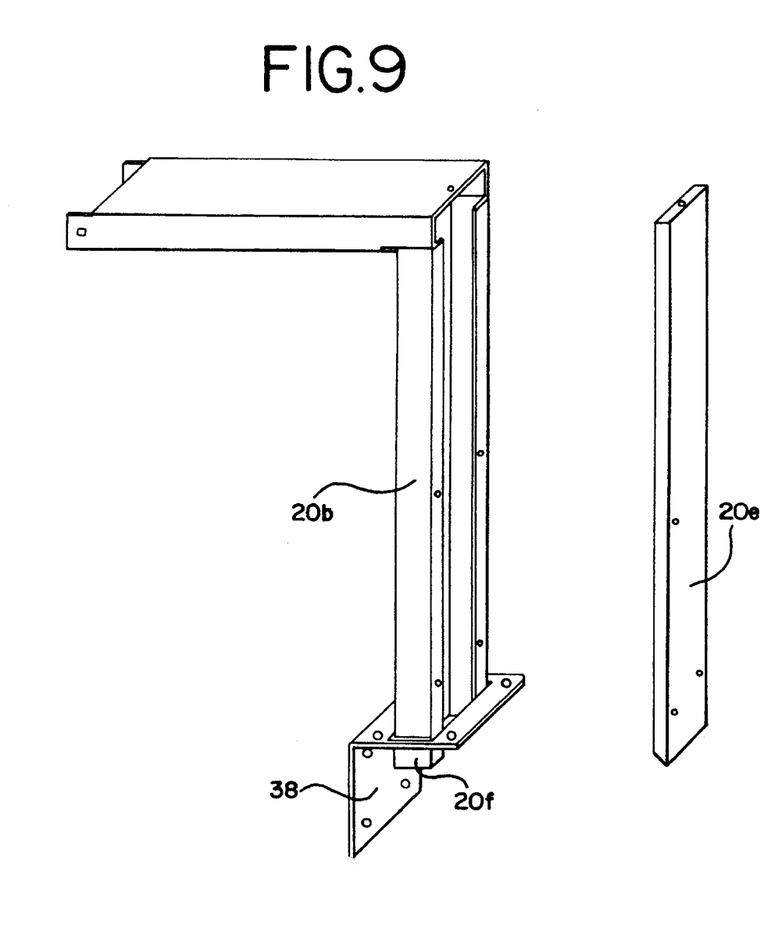
FIG. 9 is a perspective view of the service entrance bus with the service entrance bus cover removed from the main portion.
Figure 10:
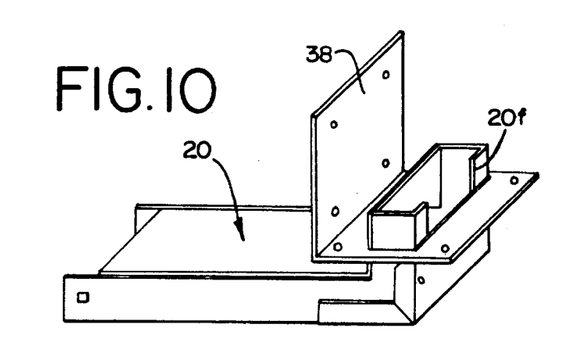
FIG. 10 is a perspective view of an alternate embodiment of the busway having a 90 degree bend at the cable busway end for connecting to the service load center.
Figure 11:
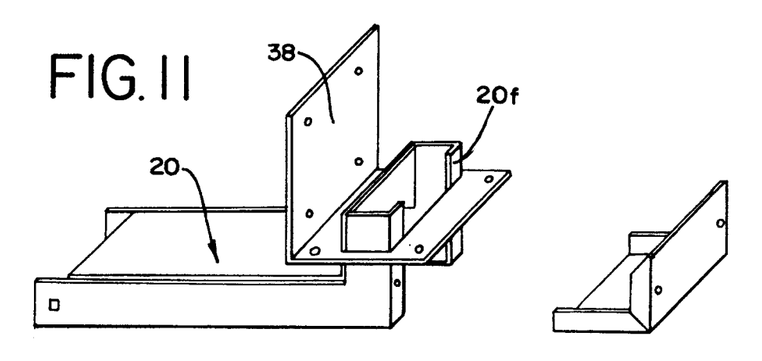
FIG. 11 is a perspective view of an alternate embodiment of the service entrance bus having a 90 degree bend at the bus end for connecting to the service load center with it's end piece removed.

The end portion 20f fits into a rectangular aperture locked in the top of the circuit breaker panel. The bracket plate 38 attached to the end portion 20f is mounted to the top edge of the circuit breaker panel as seen in FIGS. 1, 6 8 to secure the busway 20 to the service circuit breaker panel 22.

As seen in FIG. 6, the service entrance conductors 40 extend from the utility meter or current transformer located in the meter fitting housing 12 out of the housing 12 through the aperture 12a and busway 20 into the service circuit breaker panel 22 connecting to the service main circuit breaker 22a and neutral block 22b.

As seen in FIGS. 20–27, the busway 20 may also have bushings 42 and 44 inserted at its ends. Each bushing 42 has cable passageways 46 therein for accommodating the cables 40 passing through the busway 20. As seen in FIGS. 20–24, the bushings 42 may have straight cable passageways 46 for placement at the straight ends of the busway 20, or as seen in FIGS. 20 and 25–28, the busway 20 may have bushings with passageways having 90 degree bends for placement at the elbow end of the busway 20. Preferably, the bushing is made from a polymer or other electrically non-conductive material. Different configurations of the electrical meter service panel combination 10 are available for various applications on building foundations. As shown in FIG. 12, for a building having a full basement, the panel combination 10 is mounted on a basement foundation wall 34 of a full basement with the meter fitting housing 12 located outside the building and the circuit breaker panel 22 extending down the inside of the basement wall 34. The cable busway is arranged to where the insert portion 20a is located on top of the foundation wall 34 and the connecting main portion 20b extends downwardly along the foundation wall 34 to the circuit breaker panel 22.

As shown in FIG. 13, for a building having a hair basement, the cable busway 20 is positioned on top the foundation wall 34 connecting the meter fitting housing 12 located on the outside of the foundation wall 34 to the circuit breaker panel 22 positioned above the foundation wall 34 adjacent the inside of the foundation wall.

Figure 14:
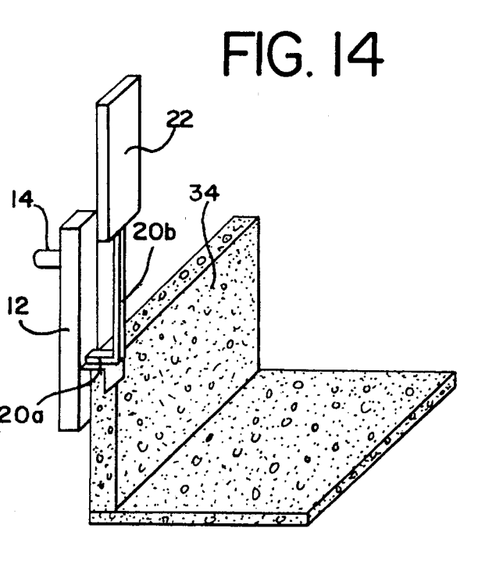
FIG. 14 is a perspective view of an embodiment of the electrical meter service panel combination mounted to a foundation wall with the main portion of the busway extending upwardly with the service load center attached above for use on the first floor of a building.

As shown in FIG. 14, for locating a circuit breaker panel 20 on the first floor of buildings, the insert portion 20a of the cable busway is positioned on top of the foundation wall 34 with the main portion 20b extending upwardly to the circuit breaker panel 22 located on the first floor of the building.

For buildings utilizing current transformers 16, configurations of the electrical meter service panel combination, such as the one shown in FIG. 18 can be utilized where the meter fitting housing 12 holding the current transformer 16 is located against the outside of the foundation wall 34, the circuit breaker panel 22 is located against the inside of the foundation wall 34, and the busway 20 is located on top of the foundation wall 34, connecting the meter fitting housing 12 and circuit breaker panel 22 together.

The cable 40 that connects the utility meter or current transformer to the service disconnecting means can be made from MTW wire to facilitate the tight radius bends that exist in the configuration of the busway having a 90 degree bend. MTW is a particular type of insulation around the conductor. In the preferred embodiment the conductor is copper wire. Flexibility is achieved through a combination of an MTW jacket and the copper wire that exists in hundreds of fine strands. Other types of wire may by used to achieve similar flexibility, however, no other wires are known to be used in the building construction industry.

Figure 29:
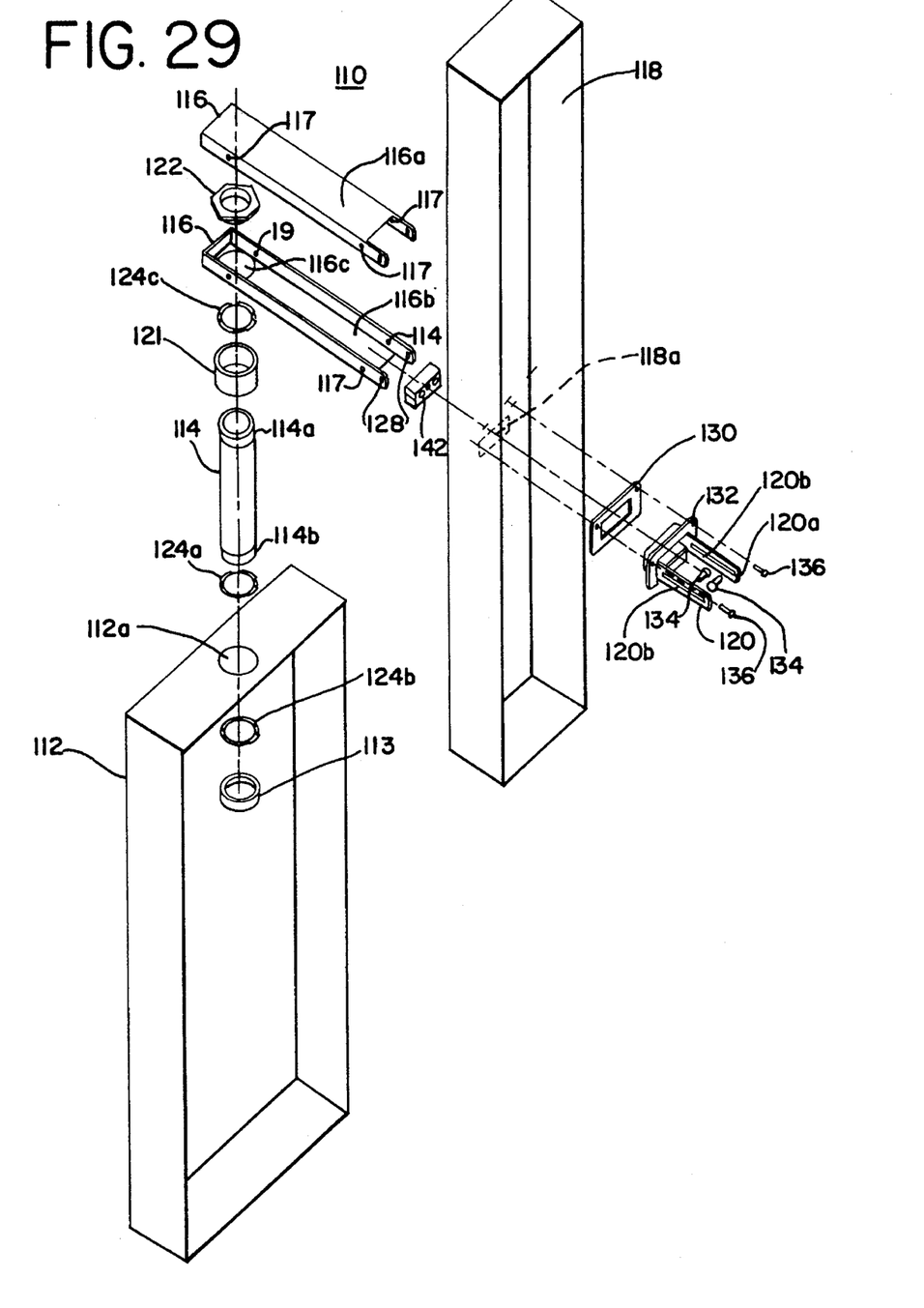
FIG. 29 is an exploded perspective view of an alternate embodiment of the electrical busway meter service panel combination excluding any pre-wiring.

In an alternate embodiment as seen in FIG. 29, the meter service panel combination 110 primarily includes a service disconnecting means panel 112, a standard two (2) inch round conduit 114 having threaded ends 114(a) and (114(b), an alternate insert busway 116 having a top busway portion 116(a) and a bottom busway portion 116(b) with a conduit hole 116(c) therein, a meter fitting housing 118, a support bushing block 142, and an adjustable busway fitting 120.

The service disconnecting means panel 112 has a hole 112(a) therein for accommodating connection of the conduit 114 thereto. The conduit 114 attaches to the perimeter of hole 122(a) by means of two lock nuts 124 and a lug 113 being secured to threaded end 114(b). One lock nut 124(a) is secured on threaded end 114(b) adjacent the outside perimeter of hole 112(a) and the other lock nut 124(b) is secured to the threaded end(b) adjacent to the inside perimeter of hole 112(a). Lug 113 is secured to the threaded end 114(b) adjacent lock nut 124(b).

Figures 34, 35, 36, 37, 38, 39:
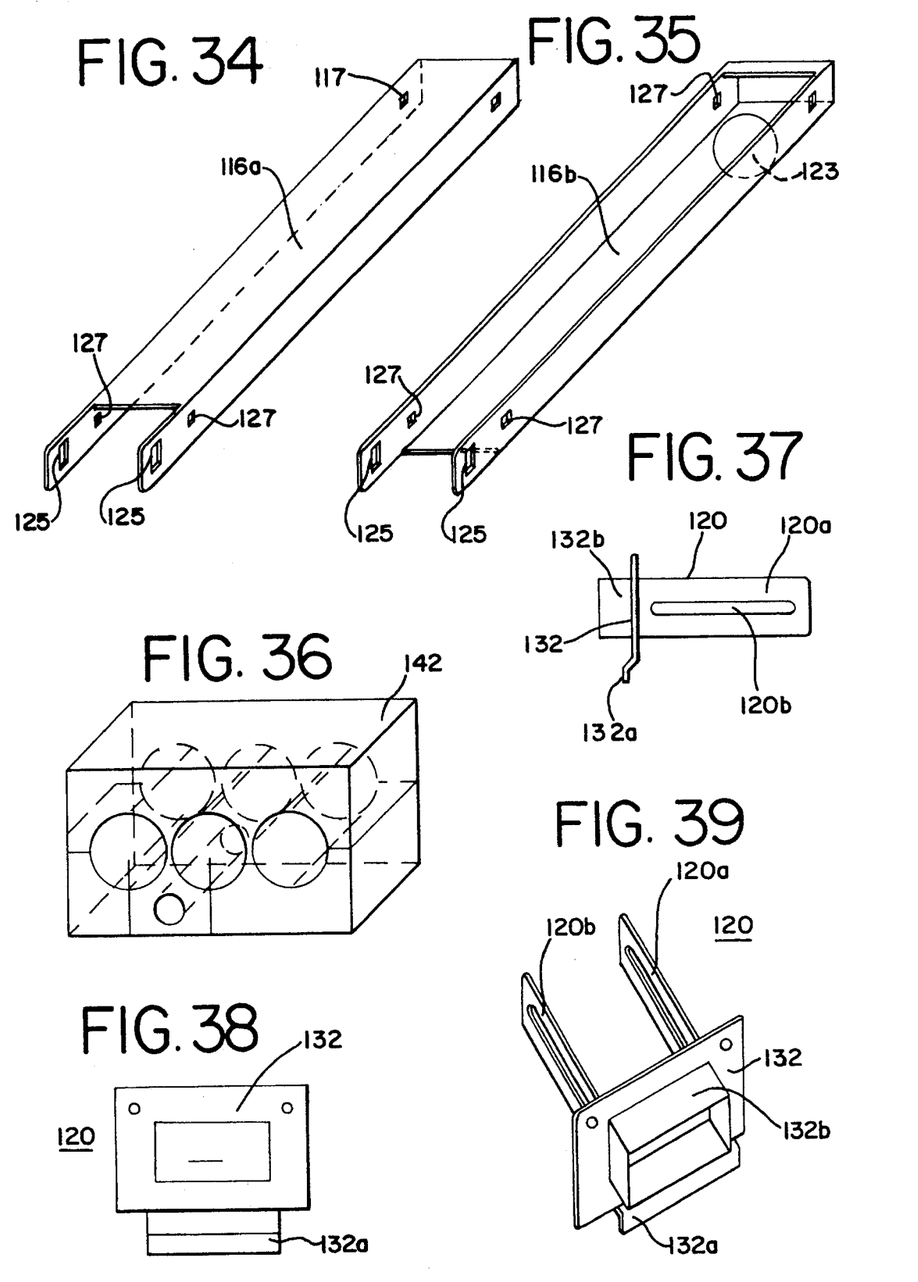
FIG. 34 is a perspective view of the top busway portion.
FIG. 35 is a perspective view of the bottom busway portion.
FIG. 36 is a perspective view of the conductor support block.
FIG. 37 is a side plan view of the of the busway fitting and attached busway fitting plate.
FIG. 38 is a front plan view of the busway fitting and attached busway way fitting plate.
FIG. 39 is a perspective view of the busway fitting and attached busway fitting plate.

The other threaded end 114(a) of the conduit 114 is secured the alternate insert bus portion 116 by means of a coupling 121, a lock nut 124(c) and a chase bushing 122. The coupling 121 has an threaded inside bore which is securably fastened around the threaded end 114(a) of the conduit 114. A lock nut 124(c) fits within the bore edge of the coupling 121. A chase bushing 122 fits within hole 116(c) extending through the hole and through lock nut 124(c) securably attaching within the threaded bore of the coupling 121, thereby attaching the bottom busway portion 116(b) to the conduit 114. The outside surface of the longitudinal walls of the top busway portion 116(a) fit adjacent the inside surface of the longitudinal walls of the bottom busway portion 116(b). As seen in FIGS. 29, 34–35, bottom busway portion 116(b) have rectangular tabs 127 which snap fit into rectangular holes 117 of the top busway portion 116(a). The bottom busway portion 116(b) also has adjustment holes 128 therein. A conductor support block 142 fits between the longitudinal side walls of the insert busway 116 at the its end. The conductor support block 142, as better seen in FIG. 36, has three holes extending therethrough for accommodating electrical conductors. The conductor support block 142 has slip construction having a top half and a bottom half.

Figures 30, 31, 32, 33:
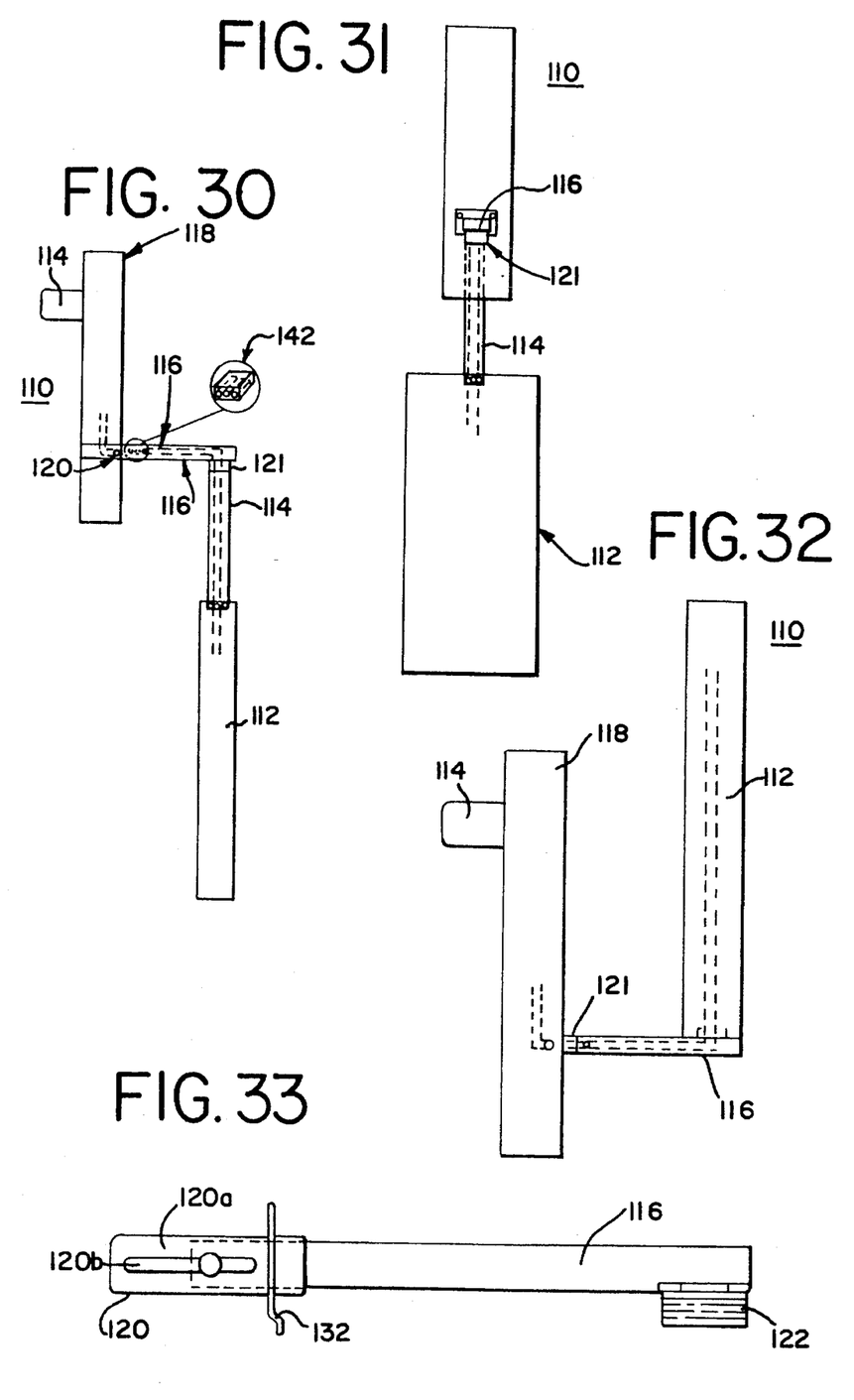
FIG. 30 is a side plan view of an alternate embodiment of the electrical meter service panel showing the service disconnecting means panel in abasement position.
FIG. 31 is a rear plan view of the alternate embodiment of the electrical meter service panel.
FIG. 32 is a side plan view of the alternate embodiment of the electrical service panel combination showing the service disconnecting means panel in an upper position.
FIG. 33 is a side plan view of the alternate insert busway showing an attached chase bushing and adjustable busway fitting.

The insert busway portion extends through an aperture 118(*a*) located in the meter fitting housing 118. Mounted within the meter fitting housing 118 and around the aperture 118(*a*) is a gasket 130. The gasket 130 fits between the meter fitting housing 118 and an adjustable busway fitting plate 132. As seen in FIGS. 29 and 33, the adjustable busway fitting plate 132 has a rectangular aperture 132(*b*) therein and a horizontal bend portion 132(*a*) extending across its bottom. The busway fitting plate 132 is mounted on and around an adjustable busway fitting 120. The adjustable busway fitting includes two extending members 120(*a*), each extending member 120(*a*) having a slot 120(*b*) therein. The adjustable fitting plate 132 mounts onto the meter fitting housing 118 by inserting and positioning the horizontal bend portion 132(*a*) of plate 132 through aperture 118(*a*) whereas the bend portion 132(*a*) rests atop the bottom surface of aperture 118(*a*) and extends adjacent and below the bottom of aperture 118(*a*) outside the meter fitting housing 118. Additionally, as seen in FIG. 29, bolts 136 are bolted through the fitting plate 132 and gasket 130, and back of the meter fitting housing 118, thereby securingly mounting the busway fitting 120 to the meter fitting housing 118.

The end portion of the insert busway 116 having adjustment holes 128 therein is adapted to adjustably slide through aperture 118(*a*) and through the rectangular aperture 132(*b*) to positions where the adjustment holes are inside and adjacent to slots 120(*b*). Bolts 134 are tightenable within slots 120(*b*) and adjustment holes 128. Adjustment of the adjustment hole 128 positions along slots 120(*b*) enables the exposed insert busway 116 to be adjustable in length, thereby, allowing the electric service panel combination 110 to be mountable on foundation walls of varying thicknesses.

Electrical conductors 140 connect the meter 14 or current transformer 16 to the service disconnecting means 142. The conductors extend from the meter or current transformer 16 inside the meter fitting housing 118, through the meter fitting housing aperture 118(*b*) and insert busway 116, and through the conduit and hole 112*a* connecting to said meter disconnecting means housed inside said service disconnecting means panel 112.

What is claimed is:

1. An electrical busway meter service panel combination, comprising:

a meter fitting housing for housing a utility meter or at least one current transformer, said meter fitting housing having a housing aperture therein;

an insert busway for holding electrical conductors therein, said busway having a first end and a second end, said first end being positioned and slidable within said housing aperture;

said second end being integral to an outside portion of said insert busway which extend outside said meter fitting housing;

a conduit having a conduit first end and a conduit second end, said conduit first end being attached to said insert busway second end; and a service disconnecting means housing, said service disconnecting means housing being connected to said conduit second end.

2. An electrical busway meter service combination as in claim 1 wherein, said electrical busway meter service combination is further comprised of a utility meter mounted in said meter fitting housing, a service disconnect means mounted in said service disconnect means housing, and at least one electrical conductor connected to and between said utility meter and said service disconnecting means.

3. An electrical busway meter service combination as in claim 1 wherein, said electrical busway meter service combination is further comprised of at least one current transformer mounted in said meter fitting housing, a service disconnect means mounted in said service disconnect means housing, and at least one electrical conductor connected to and between said current transformer and said service disconnecting means.

4. An electrical busway meter service combination as in claim 1 wherein, said electrical busway service combination includes means for adjusting the length of the outside portion of said insert busway extending outside said meter fitting housing.

5. An electrical busway meter service combination as in claim 4 wherein, said means for adjusting the length of said insert busway includes an adjustable busway fitting having a busway fitting aperture therein and at least one extending member having a slot therein, said busway fitting being mounted to said meter fitting housing in a position where said busway fitting aperture is at a corresponding adjacent position to said meter fitting housing aperture, said means for adjusting the length of said insert busway further includes said insert busway first end having an adjustment hole therein, said insert busway first end being slidable through said busway fitting aperture, said insert busway first end being lockable along said slot by means of tightening a bolt through said adjustment hole and corresponding adjacent slot.

6. A meter fitting housing, said meter fitting housing having an aperture therein;

a utility meter mounted in said meter fitting housing;

a service disconnecting means;

a cable busway connected between said meter fitting housing and said service disconnecting means;

a foundation bracket mounted to said meter fitting housing; and wherein said meter fitting housing includes means for adjustably mounting said cable busway therein through said aperture;

wherein, said means for adjustably mounting said busway further comprising opposed extending members; said extending members each having a slot adapted to receive a fastener; said fastener being adapted to fix said busway at a selected horizontal position.

7. A busway as in claim 6, wherein, an electrical conductor is prewired in said busway for connection between said utility meter and said service disconnecting means;

said busway is adapted to direct said conductor in a substantially horizontal direction between said housing and said service disconnecting means; and said busway is further adapted to communicate with a vertical portion directing said conductor in a vertical direction to permit mounting of said housing and said service disconnecting means at selectable relative heights.

8. A housing comprising one of either a meter fitting housing adapted to receive a utility meter, or a power transformer housing adapted to enclose a power transformer, said housing being mountable to an exterior wall of a building, said housing having an aperture therein;

a service disconnecting means for selectively connecting and disconnecting electrical service, said service disconnecting means being adapted to receive an electrical conductor;

busway means for carrying said electrical conductor receivable in said aperture, being connected between said housing and said service disconnecting means;

said housing includes means for horizontally adjustably mounting said busway means in said housing through said aperture;

wherein, said means for adjustably mounting said busway includes a trough bracket mounted in said housing adjacent said aperture, said trough bracket having at least one slotted side having a bracket bolt passing through said slotted side and connecting to said busway.

* * * * *